United States Patent [19]
Leonard et al.

[11] 3,861,742
[45] Jan. 21, 1975

[54] SAFETY SEAT

[75] Inventors: William A. Leonard, Plymouth; David M. Preston, Royal Oak; Thomas W. Smith, Utica, all of Mich.

[73] Assignee: The Firestone Tire & Rubber Company, Akron, Ohio

[22] Filed: Mar. 3, 1971

[21] Appl. No.: 120,524

[52] U.S. Cl. ............... 297/216, 297/253, 297/390
[51] Int. Cl. ............................................ A63b 35/00
[58] Field of Search .......... 297/390, 253, 216, 250, 297/256, DIG. 2, 443, 452, 445, 130, 134, 450; 248/188.91

[56] References Cited
UNITED STATES PATENTS

| 2,317,894 | 4/1943 | Doty | 297/253 |
| 3,232,665 | 2/1966 | Von Wimmersperg | 297/390 |
| 3,305,265 | 2/1967 | Linden | 297/253 |
| 3,424,497 | 1/1969 | Brilmyer | 297/390 |
| 3,454,304 | 7/1969 | Hudak | 297/253 X |
| 3,501,200 | 3/1970 | Ohta | 297/216 X |
| 3,523,710 | 8/1970 | Barecki et al. | 297/445 X |
| 3,524,678 | 8/1970 | DeLavenne | 297/216 |
| 3,586,376 | 6/1971 | LeMire | 297/216 X |
| 3,603,638 | 9/1971 | McGregor | 297/216 |

Primary Examiner—Francis K. Zugel
Attorney, Agent, or Firm—Miller, Morriss, Pappas & McLeod

[57] ABSTRACT

A safety seat for automobile passengers and for children which is formed from permanently deformable structural stock having a body contoured semi-flexible seat clipped to and in support of a portion of the structural frame. In turn, the frame supports the seat. The seat and frame combination is usable in both directions and the safety seat includes a deformable crash pad which in one direction is in interference relation to the head and shoulders of a child in said seat positioned for automotive use. The child's seat as described is supported on a bench type or lock back automobile seat and is secured in place by an ordinary seat belt. The back of the automotive seat forms a back support for the child. The crash pad is forward of and obstructs the creash path of the head and shoulders of the child. As the child or passenger impacts against the crash pad, the light weight structural frame deforms to absorb and spend the energy in avoidance of "spring back." Hence, the device employs what could be characterized as an inertial lever accomplishing a calculated collapse on collision impact situations. When removed from the automobile, the infant is reversed in direction and the chair acts as a chair extension or high chair in restaurants and the like, the barrier then serving as a head and back rest.

6 Claims, 8 Drawing Figures

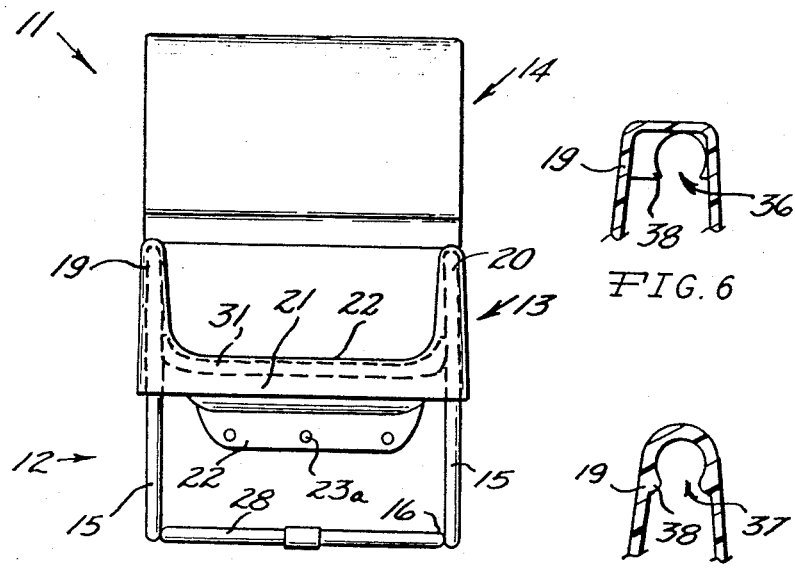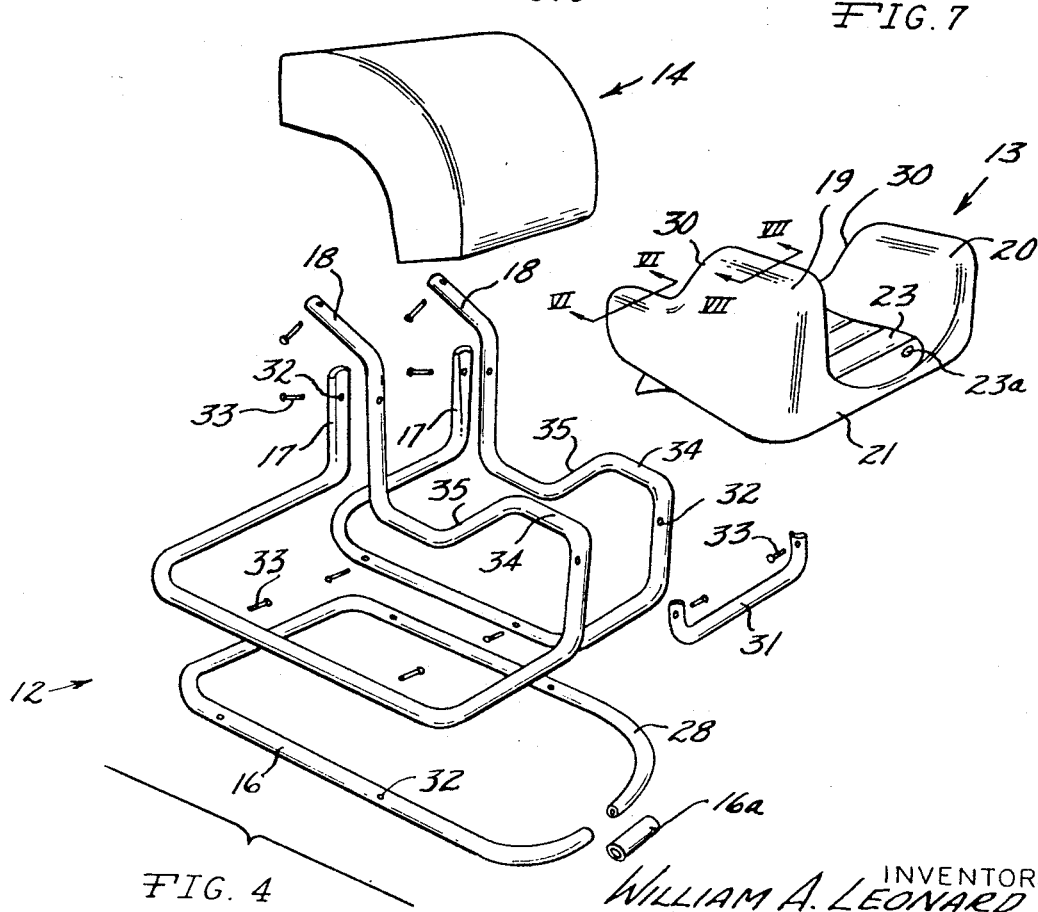

INVENTORS
WILLIAM A. LEONARD
DAVID M. PRESTON
THOMAS W. SMITH

BY Miller Morris Pappas & McLeod
ATTORNEYS

SAFETY SEAT

The present invention is a safety seat for children for use in automobiles. More particularly, the present invention includes a light weight structural stock frame such as thin wall tubing. The stock is selected to permanently deform on shock loading wherein the deformation absorbs the inertial force of the projected body and in avoidance of the frequently fatal "snap back" injuries. The device is convertible in the sense that the chair can be removed from the vehicle and positioned, say, in a chair in a restaurant where the crash pad forms a back for the infant or child and the child is elevated to table height.

Children and infants particularly have presented unique support problems in automobiles because the safety equipment is designed for adults and the child, standing for example, on the seats of the car is in a highly precarious and vulnerable position. Tight restraints are objectionable and seat back supported units becomes projectiles under the inertial response to a sudden stop and in some instances the seat back collapses on impact. Examples of prior art devices are seen in the U.S. Pat. Nos. 2,777,502 to Travis for a box-like unit having a bottom resting on the automotive seat and the back devised to prevent seat back collapse; 2,726,711 to McAndrews for a belt girth device on a seat back mounted bar; 2,404,108 to Stauffacher showing a fabric support element; 3,232,665 and 2,947,353 to Von Wimmersperg for a rigid tubular seat structure; and 3,424,497 to Brilmyer for a rigid molded construction having a separate pillow-like seat.

Accordingly, the principal object of the present invention is to provide a new and improved safety seat for children in automobiles.

In accomplishment of the principal object a permanently deformable structure is sought in which the frame absorbs a substantial force of the impact on the child and in improved prevention of snap-back.

It is also intended as an object that the present device be supported upwardly from the automobile seat so that the infant is supported on the seat of the inventive device and not directly on the automobile seat. Collaterally, the support of the infant is by a regular seat belt and the belt bears on a portion of the safety seat rather than directly against the infant. A further object is to provide a safety seat light weight structural shape unit using an assemblage of structural elements comprising the seat and pad in which the seat and pad orient the light weight frame and in which the seat and seat pad can be simply removed for washing, cleaning or replacement in respect to new frame elements.

Other objects will be appreciated by those skilled in the art as the description proceeds.

IN THE DRAWINGS

FIG. 3 is a front elevation view of the chair as seen in FIG. 2.

FIG. 4 is an exploded perspective view of the components comprising the chair seen in FIGS. 1–3 inclusive, and illustrates the simplicity of fabrication and assembly.

FIG. 6 is a cross section elevation view taken on the line VI—VI of FIG. 4 and indicating the snap-type connection securing the molded seat to the tubular frame.

FIG. 7 is a cross section elevation view taken on the line VII—VII of FIG. 4 and showing the upper integral clip supporting and positioning the arm of the molded seat to the tubular frame.

GENERAL DESCRIPTION

In general, a light weight structural stock such as thin walled tubular stock is formed into a frame and the frame is provided so as to deform permanently when stressed beyond the normal load carrying capacity of the frame. The frame is in three pieces. Two of the pieces are identical and the third frame piece is a loop base securing the two symmetrically and substantially identically formed side pieces in spaced apart relation at the bottom. The base is closed as by a resilient element or sleeve covering the terminal ends of the tube base loop. A resin seat is formed to cooperate with the configuration of the two upstanding frame pieces and the resin seat grips these upstanding frame elements while providing a seat surface utilizable by an infant facing in two directions (inside the vehicle and as a seat elevator outside the vehicle). This gripping and configuration of the seat ties the frame together and the terminal ends of the frame pieces project in one of the seating directions. These projecting ends then provide a mounting for a transverse crash pad positioned in interference relation across the projected path of the head and shoulders of the seated passenger or child. On an abrupt vehicular stop, when the head and shoulders strike the pad, the projecting portions are acted upon as an inertial lever and the frame pieces are deformed in a permanent manner to absorb the shock of the crash.

The geometry of the seat, a permanently deformable frame, a lever projection or extension from the frame and integral or connected therewith, and a crash barrier adjacent the end of the lever projection and capable of creating a calculated deformation proportional to the strength of the impact of passenger with barrier. The frame is intended to rest on the seat of an automobile and be supported against forward projection by an ordinary seat belt. The base or loop frame tucks between the seat bottom and seat back. The resin seat is above the base loop and the seat belt abuts the force transmission buttress on the seat. When the safety seat is removed from a vehicle it is light enough to easily carry and the child's position can be reversed in the resin seat so that the barrier forms a seat back and the safety chair can then be used as a high chair supplement in restaurants or the like.

SPECIFIC DESCRIPTION

Figure 1:
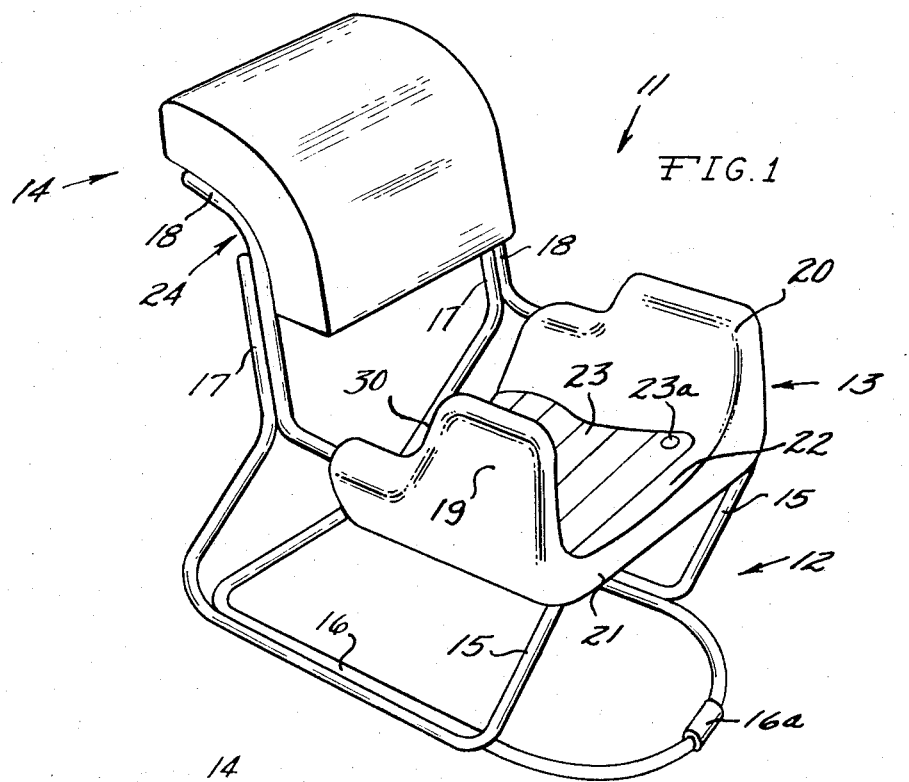
FIG. 1 is a perspective view of a fully assembled safety chair in accord with the present invention.

Referring to the drawings and particularly to the FIG. 1 thereof, a child's safety seat 11 in accord with the present invention is best illustrated and separated from either an automotive or high chair environment. The child's chair or seat 11 includes a light weight structural support frame 12 shown as thin-walled tubing; a contoured seat 13 supported by the frame 12 and in turn removably securing the elements of the frame in operative relation; and a crash pad or cushion 14 which, as will be seen, is in the path of an infant's head and shoulders in the event of a sudden stop or front end collision and the pad 14 is forwardly of the infant as seated in a land, sea, or air vehicle, for example, an automobile. The frame 12 is preferably constructed from thin-wall metal tubing. The material thicknesses and resistance to bending is carefully considered in relation to the size and weight of infants using the seat 11 and takes into consideration the desired deformation stress to be handled. Aluminum has served as a good and reasonably priced frame material. The frame 12 is assembled in three parts. The two side pieces 15 are substantially identical in configuration and are bent to flank a base loop piece 16. The loop piece 16 is bent or formed from light weight structural material such as tubing and the loop configuration is substantially in a single base plane. The ends of the base loop 16 are inserted in the closure sleeve 16a. The elements 15 are secured to the base piece 16 in spaced apart register as seen and rise vertically from the plane of the base loop 16. The upstanding portions of the side elements 15 are configured to support and be supported by the seat 13. Then, the terminal ends 17 and 18 of the structural elements 15 buttress each other for a small distance and the terminal ends 18 then extend to form (with appropriate bending) a mount for the crash pad or cushion 14. The crash pad 14 is backed (as will be seen) by a support plate spanning the gap between the terminal ends 18 of the frame pieces 15 to provide a crash barrier and to complete, with the frame 12, an inertial lever movable upon application of suitable force. The seat 13 is preferably of resin material molded so as to be pocketed in the deep portions 19 and 20 so as to capture therein a substantial portion of the convolutions of frame pieces 15. A peripheral integral depending skirt 21 traps a transverse bracket support, as will be seen, and in other particulars contoured resin seat 13 is molded to support and strengthen the frame elements 15 in spaced relation.

The molded child's seat 13 includes an integral seat bottom 22 and removably secured thereto is the seat pad 23. Fasteners 24, such as snaps molded in situ, allow the removal of the pad 23 for cleaning. As will be seen, the insertion of the frame pieces 15 into the molded pockets 19 and 20 is accompanied by integral detenting action gripping the structural stock of the frame 12. The pocket portions 19 and 20 also serve as arm rests, whether the infant is facing the crash pad or cushion 14 or facing away from the cushion 14. The cushion 14 is padded and covered as by attractive vinyl fabric and a backing piece is riveted or otherwise fastened to the ends 18 of the frames 15. These elements 18 are bent at bends 24 which allow permanent deformation at the transition points of the structural elements 17 and 18 above and below their parallelity since there is, at these points, a marked transition in strength.

Figure 2:
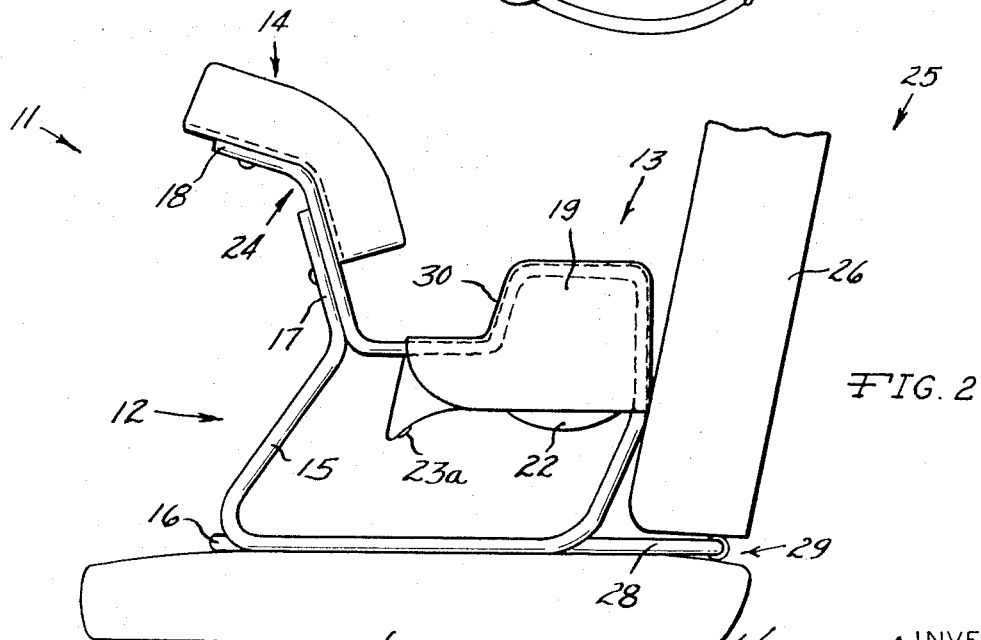
FIG. 2 is a side elevation view of the chair seen in FIG. 1 and positioned loosely and removably on an automobile seat comprising cushion and back.

In FIG. 2, the chair or seat 11 as seen in FIG. 1 is located in respect to an automobile or vehicle seat 25 comprising a back 26 and a seat bottom 27. The automobile seat back 26 may be hinged in respect to the seat bottom portion 27 but the hinge is locked when the vehicle is moving or the seat 25 is of the bench type. The seat type is important so that the seat 25 does not move forward on stops or impact of the car with some object forwardly of the vehicle. The base loop 16 of the child's seat 11 is positioned on the automobile seat 27 as shown and includes projecting portion 28 which extends between the back portion 26 and the seat portion 27 of the vehicle seat 25.

The projection 28 stabilizes the base loop 16 but in a vehicle such as an automobile the projection extends into the gap 29 between the seat belt 26 and seat bottom 27 as shown. Then, as will be seen, an ordinary seat belt, serving the vehicle seat 25, can be fastened about the seat 11 and particularly against the receiving surface 30 to hold the entire infant seat 11 firmly against the vehicle seat back 26 and bottom 27 and secure in relation to the total vehicle seat 25. The seat 25 will be understood as firmly secured within its adjustable range to the floor and frame of the vehicle (not shown).

In FIG. 3 the infant seat 11 is best appreciated by a view of the seat 11 from the rear, as referenced to an automobile seat setting. Accordingly, in this FIG. 3 the viewer is looking forward toward the front of the vehicle and if the user of the seat is an infant, his or her view is partially blocked by the transverse barrier of the cushion 14. The child, in the vehicle, sits on the seat portion 13 facing the pad 14 and the pockets 19 and 20 in the seat 13 act as arm rests while supporting and being supported by the vertical frame pieces 15. As will be seen, the back of the child rests against the vehicle seat back 26 when the child's seat is positioned in a vehicle. The transverse bracket support or strut 31 is best seen in support of the peripheral rear shirt portion 21 at the rear of the seat. This strengthens and assists in orientation of the light weight structural frame in relation to the molded resin seat. The seat bottom 22 is also sufficiently visible to indicate the location of snap fasteners 23a which allow the insertion and removal of the pad 23.

FIGS. 4, 6 and 7 best illustrate the simple assembly and fabricating procedures for the infant's safety seat 11. The frame 12 is comprised of the configured structural elements 15 and 16 secured together at openings 32 as by blind rivets or other fasteners 33 suitable for securing thin-walled stock together. The spacing interval between vertical frame elements 15 is established by the loop base 16 which is closed and trimmed off by the sleeve 16a slipped over both ends of the base loop 16. The strut or bracket 31 repeats the interval and braces the frame 12 for receiving the seat 13. The frame pieces 15 are identically configured as seen to include the ends 17 and 18 that buttress each other for a distance and then the end 18 extends beyond to secure the pad or cushion 14. An inverted U portion 34 of the frame piece 15 serves to nest in the similarly configured pockets 19 and 20 of the seat 13 to result in a functional arm rest on each frame element 15 and in providing a stress transmitting surface 35 backing up the belt receiving surface 30 of the seat 13.

As will be appreciated, the seat 13 is pressed into position over the frame 12 and the pockets 19 and 20 envelop the arm rest portions of the frame pieces 13 and the skirt 21 drops over the brace strut 31. Since the seat 13 is molded of relatively resilient resin material such as vinyl, high impact styrene or the like, detent provisions are molded into the pocket portions 19 and 20 which snap over the framing material. The detent 36 is one form of fastener between seat 13 and brace 15 as seen in the FIG. 6 taken at the point VI—VI of FIG. 4 in the pocket 19. Another form, the detent 37 is seen in the FIG. 7 taken at the point VII—VII of FIG. 4. Both detents 36 and 37 are locally provided integral webs having deformable lip portions 38 deforming to admit the frame elements 15 and then closing on the frame elements 15 after entry. This facilitates snap together assembly and the skirt 21 over strut 31 anchors the seat 13 against forward or rearward stresses after assembly. The cushion or impact pad 14 is provided with an impact absorbing cushion face as shown such as a covered block of foamed polyurethane. These cushion materials are secured to a deformable thin metal backing which is in turn attached in bridging relation to the terminal ends 18 of the frame pieces 15. This can best be appreciated, including the total forward resistance function of the seat 11, as the FIG. 5 is viewed.

Figure 5:
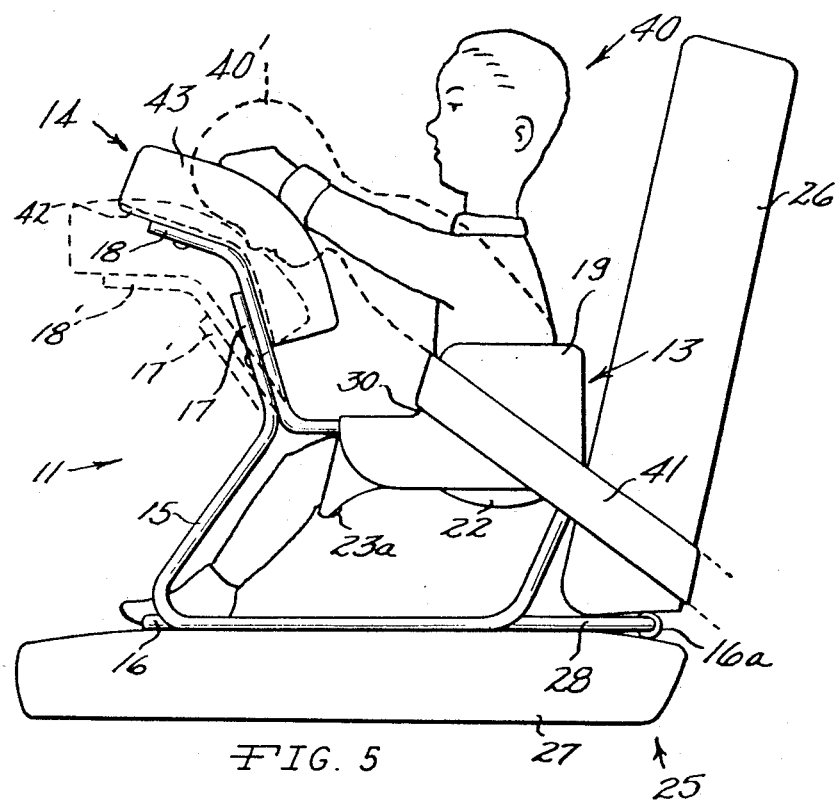
FIG. 5 is a side elevation view of the chair seen in FIG. 2 but with an infant in the safety seat, the safety seat secured in position by a conventional seat belt and indicating the projected position of the infant on impact.

In FIG. 5 an infant 40 is shown in a characteristic active position before impact and facing forwardly toward the obstruction of the crash pad or cushion 14. The chair is secured in place by the ordinary seat belt 41 which is buckled around the seat 11 and the belt shoulder 30 and is secured to suitable anchors, retraction elements, or inertial retractors not shown, but which belt secures the children's seat 11 against the vehicle seat 25 and loosely holds the child 40 in the seat 13 sitting on the seat bottom 22. The belt 41 in cooperation with its securing means and the shoulders 30 provides a fabric torso fulcrum from the webbing so that upon abrupt stop or front impact the infant 40 moves to position 40' as shown in phantom line, and if the impact is of a magnitude to create substantial inertial projection of the child 40 to position 40', then the terminal ends of the frame 15 transmit the stresses through the frame 15 and calculated deformation of the frame 15 occurs as represented by the phantom lines 18' and 17'. The deformation occurs as the yield point of the metal in the frame 15 is achieved at strategic convolutions so that the terminal ends 17 and 18 together with the cushion 14 acts on the frame 15 as an inertial lever and to the extent that permanent deformation occurs the shock is absorbed in the frame members and the chances for survival are increased. The stress of impact is transmitted to the weakened areas of the frame structure where deformation occurs. As will be appreciated in some instances, the thin metal backing plate in the cushion 14 deforms from local impacting by the head of the infant 40 and the vinyl clad padding 43 assists to prevent local trauma as body impact occurs. The child 40 is seated above the vehicle seat bottom 27 in a comfortable and relaxed seat 13 and may recline directly against the vehicle seat back 26. In some test situations deformation of a permanent type occurs at all convolutions of the seat frame in direct relation to the magnitude of the inertial shock absorbed.

Figure 8:
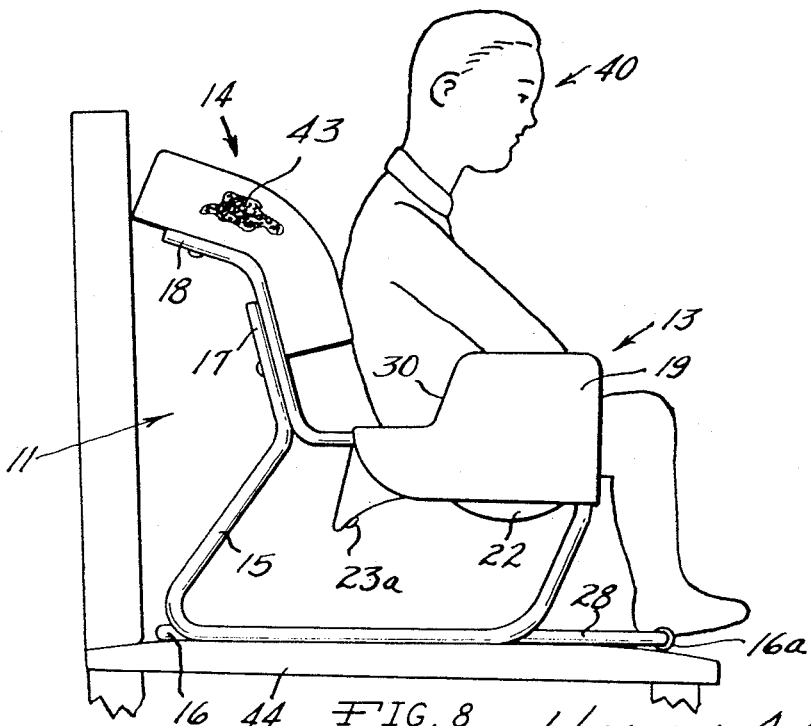
FIG. 8 is an elevation view of the chair of FIG. 1 reversed in position as seen in FIG. 5 for providing a support for the infant in a restaurant or the like and elevating the child to table height.

The open backed arm guard permitting the infant 40 to recline against the vehicle seat 26 also allows the seat 11 to be used as a high chair for the infant 40. The child 40 is reversed in position as best seen in FIG. 8 and then the seat 11 is placed on a restaurant chair 44 so that the cushion 14 acts as a back rest and the bottom 22 elevates the child to table level above the base loop 16. The extension 28 provides unusual stability and the removable vinyl cushion seat pad 23 can be unsnapped at 23a for washing and cleaning. Many persons find the seat 11 convenient for carrying the infant from the vehicle after trips and the like and the extra usage of the seat 11 as a high chair provides a welcome extension of use. The pockets 19 and 20 provide excellent arm rests in both automotive and high chair usage.

In operation, seat belts ordinarily supplied in vehicles for adult usage are applicable to the presently described seats. The child is not unduly confined and irritated by the belt which most firmly applies stress to the seat. Sled tests indicate that the shock absorption by deformation of the frame substantially reduces the chances of fatal injury to infants in front end collisions. The permanent deformation of the frame and seat elements eliminates elastic rebound and this concept can be adjusted in the construction to variant heights and weights of children.

Having thus described our invention and one form of the structure in substantial detail, others skilled in the art will appreciate improvements, changes and modifications and such improvements, changes and modifications are intended to be included herein limited only by the scope of our hereinafter appended claims.

We claim:

1. A safety seat for children comprising:
    a light weight structural frame in support of a child, said frame including extensions therefrom having weakened points;
    a crash pad interposed in the projected path of the head and shoulders of a passenger in said seat and said pad supported by said extensions of said frame and acting as a lever thereagainst whereby, upon impact of passenger with said pad, said frame deforms permanently to absorb energy against rebound.

2. A safety seat for children comprising:
    a light weight tubular structural frame and permanently deformable under impact;
    a contoured reversibly usable seat secured to said tubular frame and orienting said frame; and
    a crash pad supported by said frame in interference with the projected forward position of a child's head and shoulders, said pad or cushion deformable with the impact thereof and the impact transmitted thereby in the manner of a lever to permanently deform said frame.

3. A safety seat in accord with claim 2 wherein the shaped seat includes a contour following pair of surfaces supporting said frame and said surfaces providing buttresses for a seat belt securing said seat in an automobile seat.

4. A safety seat in accord with claim 2 wherein said frame is selectively weakened to accommodate a prearranged deformation under shock.

5. A child's safety seat for automobiles comprising:
    a light weight structural frame in three pieces, two of said pieces being identical pieces in spaced parallel register each having the ends thereof projecting forwardly and terminally and the third of said pieces being a base loop and secured to the lower ends of said two pieces said loop projecting rearwardly;
    a contoured seat including belt buttress shoulders pocketed to insert over said two of said frame pieces and securing with said base, said parallel registry as between said two frame pieces and providing arm rests; and a stiff backed cushion secured to said projecting ends of said two frame pieces securing said frame pieces in spaced apart relation and in interference path with head and shoulders of a passenger seated in said seat and upon impact a lever-like action imposes permanent deforming stresses to said frame.

6. A safety seat in accord with claim 5 wherein the pocketed portions of said contoured seat includes deformable transverse snap grips selectively securing said seat to said frame.

* * * * *

UNITED STATES PATENT OFFICE
CERTIFICATE OF CORRECTION

Patent No. __3,861,742__   Dated __1975 January 21__

Inventor(s) __William A. Leonard, David M. Preston, Thomas W. Smith__

It is certified that error appears in the above-identified patent and that said Letters Patent are hereby corrected as shown below:

In the Abstract, line 15, change "creash" to read --- crash ---

Column 4, line 11, change "belt" to read --- back ---

Column 4, line 33, change "shirt" to read --- skirt ---

Signed and sealed this 13th day of May 1975.

(SEAL)
Attest:

RUTH C. MASON
Attesting Officer

C. MARSHALL DANN
Commissioner of Patents
and Trademarks